Aug. 13, 1929.  E. C. MITCHELL  1,724,802
SAW
Filed Nov. 19, 1927

Inventor:
Edward C. Mitchell,
by Spear, Middleton, Donaldson & Hall
Attys.

Patented Aug. 13, 1929.

1,724,802

UNITED STATES PATENT OFFICE.

EDWARD C. MITCHELL, OF PHILLIPS, MAINE.

SAW.

Application filed November 19, 1927. Serial No. 234,483.

My invention relates to improvements in saws and more particularly it relates to improvements in saws of the buck type.

An object of the invention is the provision of means whereby the parts of the saw are adjustably held together and may readily be assembled and disassembled for convenience in transporting, by merely turning a hand screw.

A further object is to provide novel means for lengthening or shortening the saw blade supporting side members of the saw to increase or decrease its cutting range, and for clamping them in adjusted position.

Another object is the provision of novel means for securing the saw blade in the saw.

The invention consists in the features, combination, and arrangement of parts hereinafter described and particularly pointed out in the claims.

In the accompanying drawings:—

Figure 1:
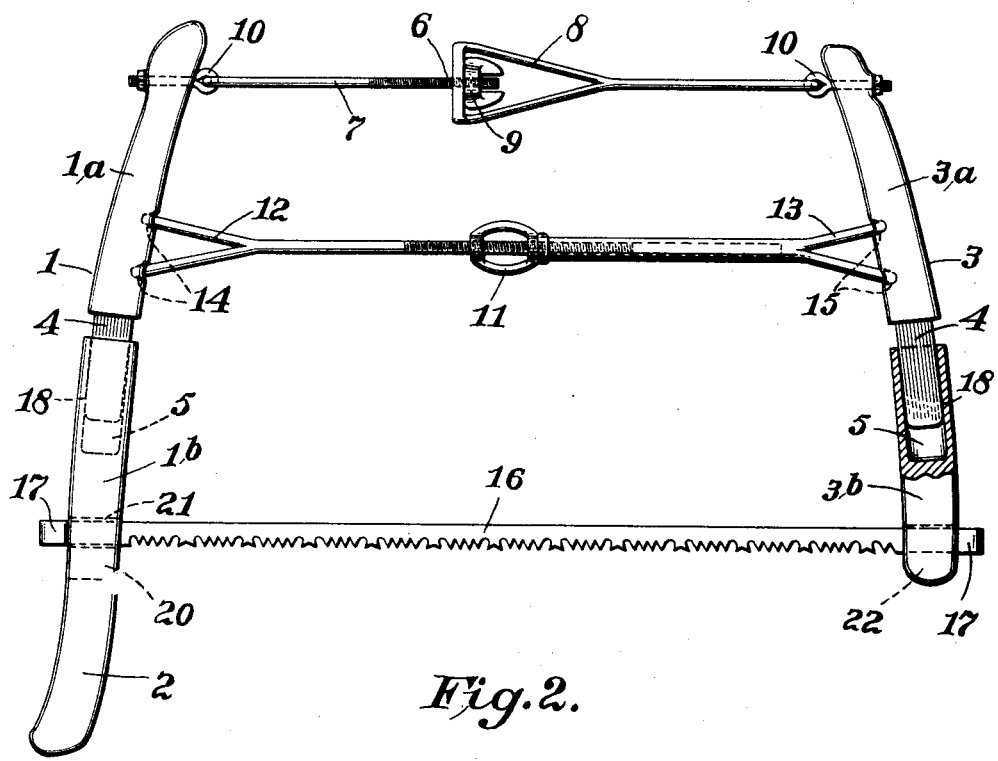
Fig. 1 is a view of the saw with the side members adjusted and clamped in a somewhat extended position.
Figure 2:
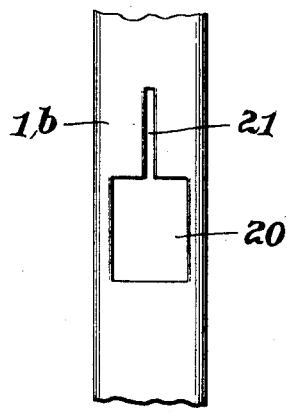
Fig. 2 is a detail view of one of the side members showing the saw blade receiving slot.

With reference to the drawings, the numeral 1 represents the side member of the saw frame which has a handle 2 depending therefrom. Each of the side members 1 and 3 are made in two relatively slidable parts 1a and 1b, 3a and 3b, respectively. The side members are to be made of metal and the parts 1a and 3a are each provided with a tongue 4 adapted to be inserted into a socket 5 in each of the parts 1b and 3b, to provide for adjustment of the length of the side members to adjust the operating range of the saw.

The side members 1 and 3 are removably and loosely connected together at their upper ends by a turnbuckle or extension rod 6 having cooperating parts 7 and 8 and nut 9, the parts 7 and 8 being removably hooked into eye bolts 10 in the side members.

A second extension or turnbuckle rod 11 extends between the side members and as shown has its forked ends 12 and 13 entering recesses or sockets 14 and 15 in the upper parts of the side members 1a and 3a. The function of the second turnbuckle or spreader 11 is that of pushing against the side members, after the saw blade 16 is inserted, to make the saw frame absolutely rigid. The side members are prevented from moving farther apart by the upper turnbuckle and by the saw blade, which has bulb-shaped enlargements 17 at its ends which engage the side members, and when the said second turnbuckle is operated to push against the side members it will be apparent that the saw frame will be rigidly clamped together.

The operating range of depth of cut of the saw may be adjusted by simply loosening the central turnbuckle 11 and adjusting the tongues 4 in the socket 5 to alter the length of the side members 1 and 3 and then tightening the central turnbuckle 11 to clamp the side members in adjusted position. It will be apparent that stress exerted outwardly against the upper parts 1a and 3a of the side members will cause their tongues 4 to clamp against the outer walls 18 of the sockets 5 to obtain a rigid saw frame.

By the above described means a very readily adjustable, but rigid and strong saw frame is obtained, which may be entirely disassembled by simply loosening and disconnecting the turnbuckles and saw blade. This demountable feature enables the saw to be readily packed in a bag or case for transportation to and from a lumber camp or other place of use.

The lower part 1b of the side member 1 having handle 2 is bored at 20 which bore is adapted for the passage of one of the enlargements 17 on the ends of the saw blade 16. In communication with the bore 20 is a slot 21 adapted to receive the saw blade 16. A terminal slot or slit 22 opening downwardly is also provided in the lower end of the side member part 3b. The saw blade is assembled in the saw by inserting the blade 16 up into the slot 22 with one of the enlargements 17 on the outside and bearing against the side member part 3b. The other end of the saw blade with its end enlargement 17 is inserted thru and beyond the bore 20 in part 1b and the blade is inserted in the slot 21 with the enlargement 17 bearing against the outside of side member part 1b. The saw frame is then clamped by turnbuckle 11 and the blade is securely held in place.

The invention is not limited to the specific embodiment shown and it is understood that various modifications may be made within its scope.

I claim:

1. In combination, in a saw, a pair of extensible side members, said side members each comprising two cooperating parts, one of said parts having a tongue and the other having a socket for receiving said tongue, a rod connecting the upper parts of said side members at their upper ends, a turnbuckle rod extending between the lower ends of said upper parts, and a saw blade connecting the lower parts of said side members at their lower ends.

2. In combination in a saw, extensible side members, each comprising an upper and a lower part, a saw blade held by the lower parts, and means between the upper parts including an adjusting device by which the said side members are subjected to strain tending to spread them apart at their lower ends.

3. In combination, in a saw, extensible side members, each comprising an upper and a lower part with a slip joint connection between them, a saw blade held by the lower parts, and means extending between the upper parts including an adjusting device to subject said parts to strain tending to spread them apart at their lower ends.

4. In combination in a saw, extensible side members each comprising an upper and a lower part with a slip joint connection between them, a saw blade held by the lower parts, and means extending between the upper parts including an adjusting device to subject said parts to strain tending to spread them apart at their lower ends, said means comprising a rod connecting the upper ends of the upper parts of said extensible side members and an extensible rod forming the said adjusting device and extending between the lower ends of said upper parts.

In testimony whereof, I affix my signature.

EDWARD C. MITCHELL.